United States Patent
Ahmed et al.

(10) Patent No.: US 11,733,255 B1
(45) Date of Patent: Aug. 22, 2023

(54) INDUSTRIAL INSPECTION SYSTEM WITH INTERLOCK

(71) Applicant: UNITED ARAB EMIRATES UNIVERSTIY, Al Ain (AE)

(72) Inventors: Waleed Khalil Ahmed, Al Ain (AE); Muthanna Ahmed Aziz, Al Ain (AE)

(73) Assignee: UNITED ARAB EMIRATES UNIVERSITY, Al Ain (AE)

( * ) Notice: Subject to any disclaimer, the term of this patent is extended or adjusted under 35 U.S.C. 154(b) by 0 days.

(21) Appl. No.: 17/957,278

(22) Filed: Sep. 30, 2022

(51) Int. Cl.
*G01B 21/24* (2006.01)
*G01N 35/00* (2006.01)
*B25J 18/00* (2006.01)

(52) U.S. Cl.
CPC .......... *G01N 35/0099* (2013.01); *B25J 18/00* (2013.01); *G01B 21/24* (2013.01); *G01N 35/00613* (2013.01)

(58) Field of Classification Search
CPC ........... G01N 35/0099; G01N 35/00613; B25J 18/00; G01B 21/24
See application file for complete search history.

(56) References Cited

U.S. PATENT DOCUMENTS

| | | | | |
|---|---|---|---|---|
| 7,251,901 | B2* | 8/2007 | Heavens | G01B 5/08 33/542 |
| 8,453,337 | B2* | 6/2013 | Lacy | G01B 5/0004 33/503 |
| 9,156,163 | B2* | 10/2015 | Umeno | B25J 9/0087 |
| 10,955,429 | B1* | 3/2021 | Burchard | B25J 11/00 |
| 11,312,021 | B2* | 4/2022 | Sejimo | B25J 13/085 |
| 11,498,133 | B2* | 11/2022 | O'Hare | B23Q 3/063 |
| 2002/0000047 | A1* | 1/2002 | Yoda | G05B 19/401 29/33 P |
| 2005/0232743 | A1* | 10/2005 | Downs | B65G 47/90 414/741 |
| 2006/0145406 | A1* | 7/2006 | Iwata | B25B 5/062 269/233 |
| 2007/0005182 | A1* | 1/2007 | Downs | B65H 29/02 700/218 |
| 2007/0062056 | A1* | 3/2007 | Heavens | G01B 3/46 33/555.1 |
| 2014/0025202 | A1* | 1/2014 | Umeno | G01N 35/0099 700/253 |
| 2014/0026430 | A1* | 1/2014 | Xu | G01B 3/34 33/549 |

(Continued)

FOREIGN PATENT DOCUMENTS

| | | |
|---|---|---|
| CN | 203534545 U | 4/2014 |
| CN | 203772240 U | 8/2014 |

(Continued)

*Primary Examiner* — Yaritza Guadalupe-McCall
(74) *Attorney, Agent, or Firm* — Nath, Goldberg & Meyer; Richard C. Litman

(57) ABSTRACT

An interlock system for an industrial inspection system. The interlock system includes a first interlock mechanism having a projection that has an internal thread extending into the projection; and a second interlock mechanism having a receiving member that receives the projection. The second interlock mechanism has a threaded shaft that extends into the internal thread of the first interlock mechanism when rotated. The second interlock mechanism moves toward the first interlock mechanism when the threaded shaft is rotated.

15 Claims, 11 Drawing Sheets

(56) References Cited

U.S. PATENT DOCUMENTS

2020/0049477 A1* 2/2020 Lankalapalli ........ G01B 11/005
2021/0220966 A1* 7/2021 Lang ....................... B25B 1/103
2021/0387360 A1* 12/2021 Kraetschmer ............. B01L 9/50

FOREIGN PATENT DOCUMENTS

| CN | 204382144 U | 6/2015 |
| CN | 206925649 U | 1/2018 |
| CN | 212903102 U | 4/2021 |
| CN | 214984867 U | 12/2021 |
| KR | 2021-0039063 A | 4/2021 |

* cited by examiner

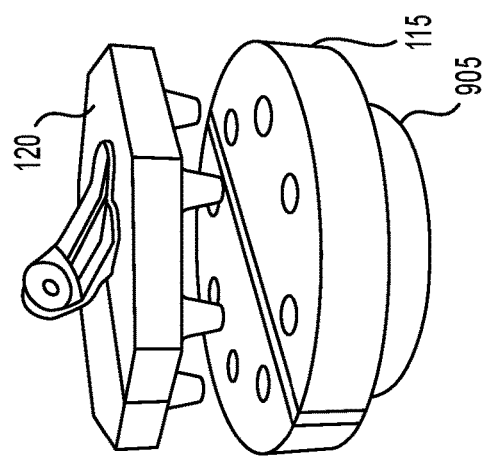
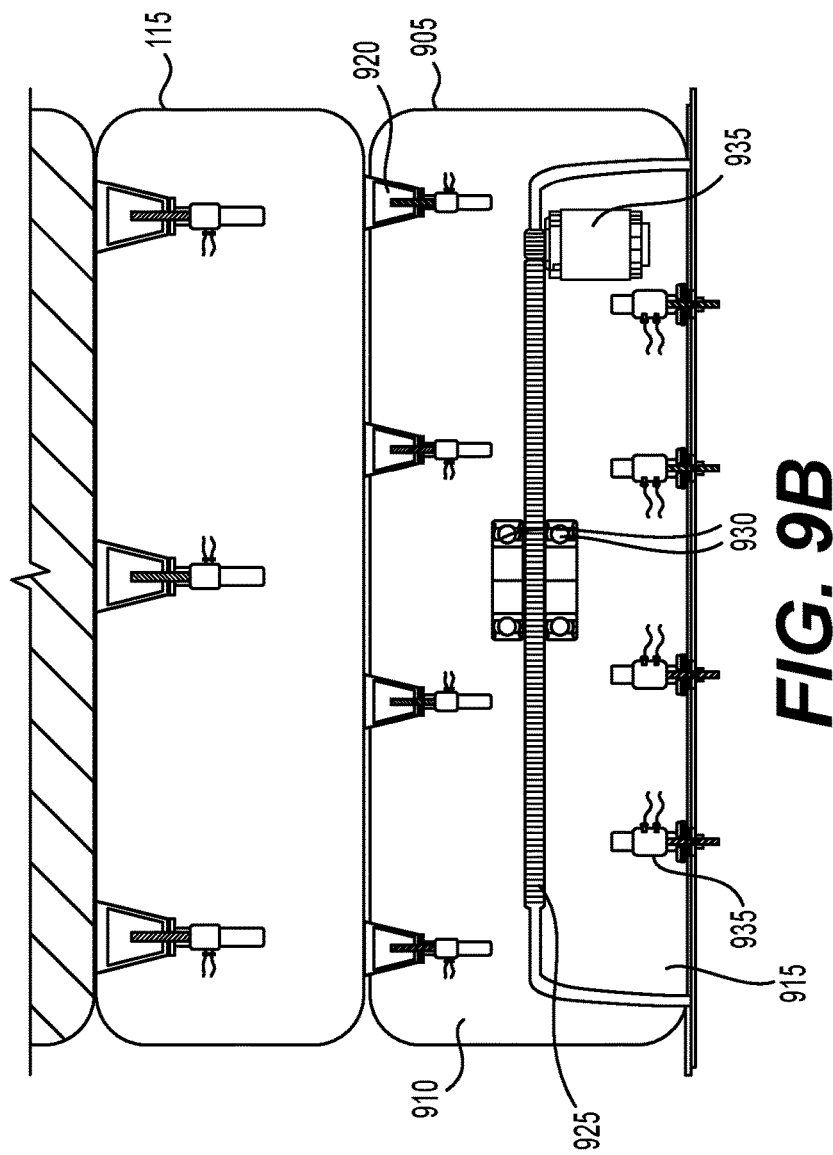
FIG. 9A
FIG. 9B

INDUSTRIAL INSPECTION SYSTEM WITH INTERLOCK

BACKGROUND

1. Field

This disclosure relates to devices such as industrial inspection systems.

2. Description of the Related Art

Inspection is a standard component of the manufacturing process; as parts come off the production line, some are examined to ensure accurate dimensions. This process requires specialized techniques to inspect a part. Two examples of fixtures used for inspection include a coordinate measuring machine CMM and check gauges. A coordinate-measuring machine (CMM) is an expensive high precision tool that probes multiple points on a part to determine if the geometry is within specification. Check gauges are another inspection fixture used to quickly and accurately determine if elements satisfy essential tolerances. If the part fits into the gauge, the part is within specification. These fixtures need to meet stiffness and precision requirements, which means they should be custom machined out of light metallic material like aluminum. However, the process is costly and there is a need to reduce the inspection time.

As the effort improves with the complexity of machined parts, it becomes bulkier to manufacture inspection fixtures that must contain complex geometries. Fixturing is significant to several manufacturing areas, but it is of particular significance to many industries. To guarantee a quality product, steps are required to be taken in manufacturing to control the procedure. Close fits and high-finish standards need timely provided information on the process. This involves robust, precise inspection fixtures and measuring instruments to generate this information.

In general, parts that are normally inspected need to be held in position with the fixture replicating the mounting of the part in the final assembly. Such fixtures are considerably more complicated with several mounting and clamping points, some of which must be removable to allow the loading and unloading of the part. These fixtures primarily include tooling balls, which establish the data. All measurement data obtained from this type of fixture indicate the part's geometry as it would be mounted on the part. Innovative fixtures include staging functions that allow various levels of assemblies to be mounted correctly as each element is attached. In addition to geometry, the fixture needs to incorporate reference surfaces to take these measurements. In some cases, numerous electronic measuring devices can be attached and directly wired to a network of computers for direct computation and immediate communication upstream and downstream.

In general, coordinate measuring machines are usually used for inspection and quality assurance. Most of the devices are sophisticated in design and operation, and they can be suited for up to five-axis measuring and three-dimensional tolerances in a wide array of contact and non-contact applications. Some examples are applications such as factory intelligence and advanced manufacturing. In general, Coordinate Measuring Machines CMMs have a heavy base plate or table, which serves as the foundation for an object placed on it to be measured. This is often a massive slab of granite or some other dense material that is stable, rigid, immune to fluctuations caused by the environment, and ground with a very flat top face. CMMs measure workpiece dimensions by moving the probe to measure the workpiece. The precise position of the contact is recorded as an XYZ coordinate and is stored by the measuring system.

Using these data points, the CMM software calculates the desired distance measurements, geometric shapes, and the relative position of geometric shapes. The tip of the probe communicates its information to a computer that interprets the data with specialized software to create a 3D map of the part in question from the cumulative set of points.

Precision is critical, not only crucial for the performance of the manufactured parts, but it is also required for safety, long life cycles, and perhaps even for life-saving technology. It is the most significant and crucial necessity to achieve a productive operating performance. One of the essential operational requirements for aerospace industries is reliability, availability, repeatability, and high utilization during working life. Quality control is a vital factor in achieving such a target. Accuracy is essential for all industrial sectors, however, considering the precision machining required to produce components and parts for the industrial and aerospace applications, reliability is indispensable. Human lives may depend on the ability of such parts to function as designed; in precision machining, there is no margin for error.

An effective quality control procedure requires standards with which each product must comply. Industrial and aerospace parts and components must meet a strict demanding standard for durability, reliability, and safety. Factors to consider include accuracy, precision, effectiveness, consistency, reliability, and cost-efficiency. In general, repeatability, accuracy, and time optimization are core targets for precision industries. Fixtures are essential components to achieve such crucial targets by providing proper components, alignment and positioning accuracy, and preventing human errors that lead to cost-saving by reducing the production waste. In addition, adopting advanced fixtures eliminates the need for highly skilled labor that positively affects total cost savings. Moreover, time can be effectively optimized.

There are many CMM machines used in the market:

1-Standard Coordinate Measuring Machines use global metrology software for measuring with or without a CAD model for automatic part program generation.

2-High-Accuracy Coordinate Measuring Machines have a high-moving speed and acceleration is achieved with improved rigid air bearings on all guideways.

3-Ultra High-Accuracy Coordinate Measuring Machines include a fixed bridge structure with superior stability of motion for world-class measuring accuracy.

4-Shop Floor Coordinate Measuring Machines are flexible measurement systems with high throughput measurements for in-line or near-line applications 5-Large Heavy Duty Machines have separate guide bridge-type coordinate measuring machines designed to measure large, heavy workpieces with high accuracy and drive speed equipped with a system to automatically restore accuracy deterioration caused by foundation deformation as a standard feature.

The disadvantages of the available solutions for quality control systems are as follows:

Heavyweight due to the big size that needs an exceptional foundation. Therefore they cannot be moved to another place. Some machines require unique support systems, like a pressurized air feeding system as well as an electrical stabilization system.

Expensive machines are not affordable for most companies, besides the depreciation is high.

The devices require highly skilled operators with long training periods and high wages, which add more operational costs to production. Besides, they also need high maintenance costs, and they need a long time for maintenance to stop the inspection process and suspend the production line.

Each machine has limited features for quality control, and if we need to go with a bigger or smaller size or higher precision quality control, we have to purchase another device since each machine has restricted capabilities.

The available systems are operated by sophisticated software that has constrained operation and quality control to force the user to purchase different versions of the systems.

The available machines have no standardization yet, since there are hundreds of different kinds of CMMs, dozens of manufacturers, and various software programs to run the machines. This means that it is more difficult to interchange software between coordinate measuring machines.

CMM systems can be complicated to operate for some, so not all users of CMMs are knowledgeable about the principles of coordinate measuring machines. It is mostly manufacturing and production experts who operate these machines, and they need to work fast because they need to make more parts to make money. They don't have as much time as quality engineers so they need simpler systems.

The calibration process is very complicated. Besides, the measuring probes used in the machines need a sophistical procedure for setting and calibration.

Some further problems in manufacturing traditional metallic fixtures is that with 3-axis mills, complexity is already restricted by machine-specific limitations, such as the lack of ability to perform undercuts. This renders specific geometries unproducible and forces you to constrain the complexity of your design to those restrictions. A specialized designer is needed to design the part for traditional manufacturing, which is not ready to be fabricated. If a fixture is to be machined, it should be prepared in a CAM ahead of time. This procedure includes selecting which tools will be used to cut the stock and planning out the paths for each instrument. Because more complex geometries often require more cutting operations, more intricate parts make for more work in a CAM, and more skilled labor is spent on fabricating the part.

SUMMARY

Embodiments of the present system highlight the design and the manufacturing of a high precision autonomous industrial inspection system. In certain embodiments, the present systems use fabricated aerospace-grade advanced composite fixtures (made of micro carbon fiber-filled polymer and fiber reinforced filament-FRP) using adaptive multi-axes actuation mechanisms to assess the quality of manufactured components and regulated parts using additive manufacturing technology. In certain embodiments, this is achieved by utilizing advanced reinforced composite material that meets the compulsory and critical standards for military and aerospace industries and to overcome the drawbacks of the manual-operated methods and satisfy the requirements for precision manufacturing and assuring the high quality and the precision of the produced components. The present system improves the accuracy of the measured data, enhances efficiency by reducing the test time significantly, and eliminates the requirement for highly skilled laborers to run the test.

The control system as described here can contain various advanced sensing elements and actuators to handle measurement requirements such as wireless measuring instruments, scanning, and robotized processes. The collected signals can be transmitted to measurement and control software through a signal conditioning and data acquisition device. In addition, actuators can be used for automatic holding and loading and measurement purposes for inspecting the components.

The following are some benefits of the design:

The inspection rate is increased since the complication of the process decreased.

Accuracy is the same as CMM and even better.

The operator's error can be minimized.

Skill requirements of the operator are reduced.

Reduced inspection fixturing and maintenance costs.

Reduction in calculating and recording time.

Reduction in setup and operation time.

No need to separate the quality control procedure for each feature.

Reduction of scrap and good part rejection.

Reduction in offline analysis time.

Simplification of inspection procedures leads to a reduction of the inspection time through the use of simple statistical analysis.

An industrial inspection system with interlock in one embodiment has a clamping device mounted on a support and a robotic arm mounted on the support spaced away from the clamping device. The industrial inspection system includes: a plurality of first interlock mechanisms each having a plurality of projections each that include an internal thread extending into the projection; a plurality of second interlock mechanisms each having a plurality of receiving members that receive the plurality of projections, each of the plurality of receiving members having a threaded shaft that extends into the internal thread extending into each of the plurality of projections when rotated. The second interlock mechanism tightens toward the first interlock mechanism when the threaded shafts are rotated. The clamping device has a base comprising: a first base portion having a first base portion vertical surface that includes a first of the plurality of second interlock mechanisms; a second base portion having a second base portion vertical surface located opposite the first base portion vertical surface, the second base portion vertical surface having a second of the plurality of second interlock mechanisms; and a base portion connecting part located between the first base portion and the second base portion, the base portion connecting part located between the first base portion and the second base portion, the base portion connecting part having a base portion first surface located opposite the first base portion vertical surface and a base portion second surface located opposite the second base portion vertical surface. The base portion first surface has a first of the plurality of first interlock mechanisms and the base portion second surface has a second of the plurality of first interlock mechanisms. Each of the first and second plurality of first interlock mechanisms is located opposite of each of the first and second of the plurality of second interlock mechanisms, and the second of the plurality of first interlock mechanisms of the second base portion is located opposite the second of the plurality of second interlock mechanisms of the base portion connecting part. That is to say, each of the plurality of projections is located opposite each of the plurality of receiving members.

The second interlock mechanism can further include a step motor that extends and retracts the threaded shaft. An electromagnetic disc that attracts the first interlock mechanism toward the second interlock mechanism can also be implemented. A transducer can also be used to detect a misalignment between the first interlock mechanism and the second interlock mechanism. A four quarters axial detection transducer can also be used for this purpose.

In another embodiment, the present subject matter relates to an interlock system for an industrial inspection system, the interlock system comprising: a first interlock mechanism having a projection that includes an internal thread extending into the projection; and a second interlock mechanism having a receiving member that receives the projection, the second interlock mechanism having a threaded shaft that extends into the internal thread of the first interlock mechanism when rotated, the second interlock mechanism tightening toward the first interlock mechanism when the threaded shaft is rotated.

These and other features of the present disclosure will become readily apparent upon further review of the following specification and drawings.

BRIEF DESCRIPTION OF THE DRAWINGS

FIGS. 9A and 9B are illustrations of a rotatable base for the industrial inspection system with interlock.

Similar reference characters denote corresponding features consistently throughout the attached drawings.

DETAILED DESCRIPTION OF THE PREFERRED EMBODIMENTS

An industrial inspection system with interlock was developed using a systematic design approach. A modular design methodology was established classifying the system into several independent units with specialized functions which are integrated to form a complete system. Benefits of this system are as follows:

Reduce design complexity by dividing the intricate design into independent modules with specialized functionality while maintaining compatibility between the modules. This enables the effective distribution of development workload by distributing the tasks to different team members. This leads to shortening the development time and increases efficiency and ensures systematic and standard development.

The concept of modular systems with independent modules facilitates debugging, upgrading, and maintaining the system, since upgrading or maintaining one module will not affect other modules.

Enables future expansion and integration and provides easy adaptability and customization to suit a variety of manufactured pieces.

Sustainability allows for recusing and upgrading of existing components.

Figure 1:
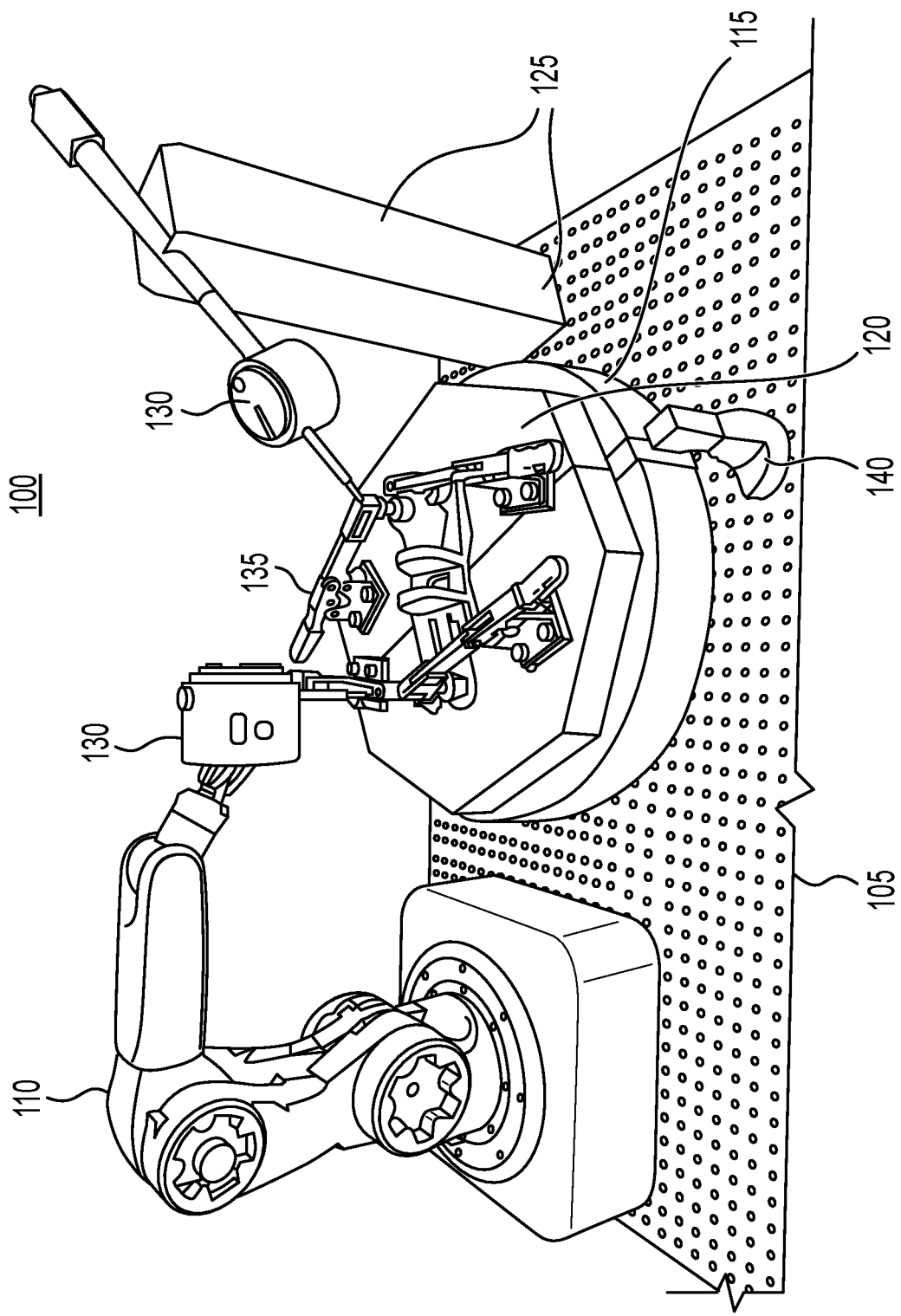
FIG. 1 is an illustration of an industrial inspection system with interlock.

FIG. 1 is an illustration of an industrial inspection system with interlock in one embodiment. The system 100 includes a support depicted as a platform 105, a robotic arm 110, a base 115, a holding fixture 120, and a fixed point measuring system 125. The robotic arm 110 and the fixed point measuring system 125 each have a gauge 130. A self-adjustable clamping system 135 is located on the holding fixture 120. A position and sensing element 140 is located next to the base 115.

Figure 2:
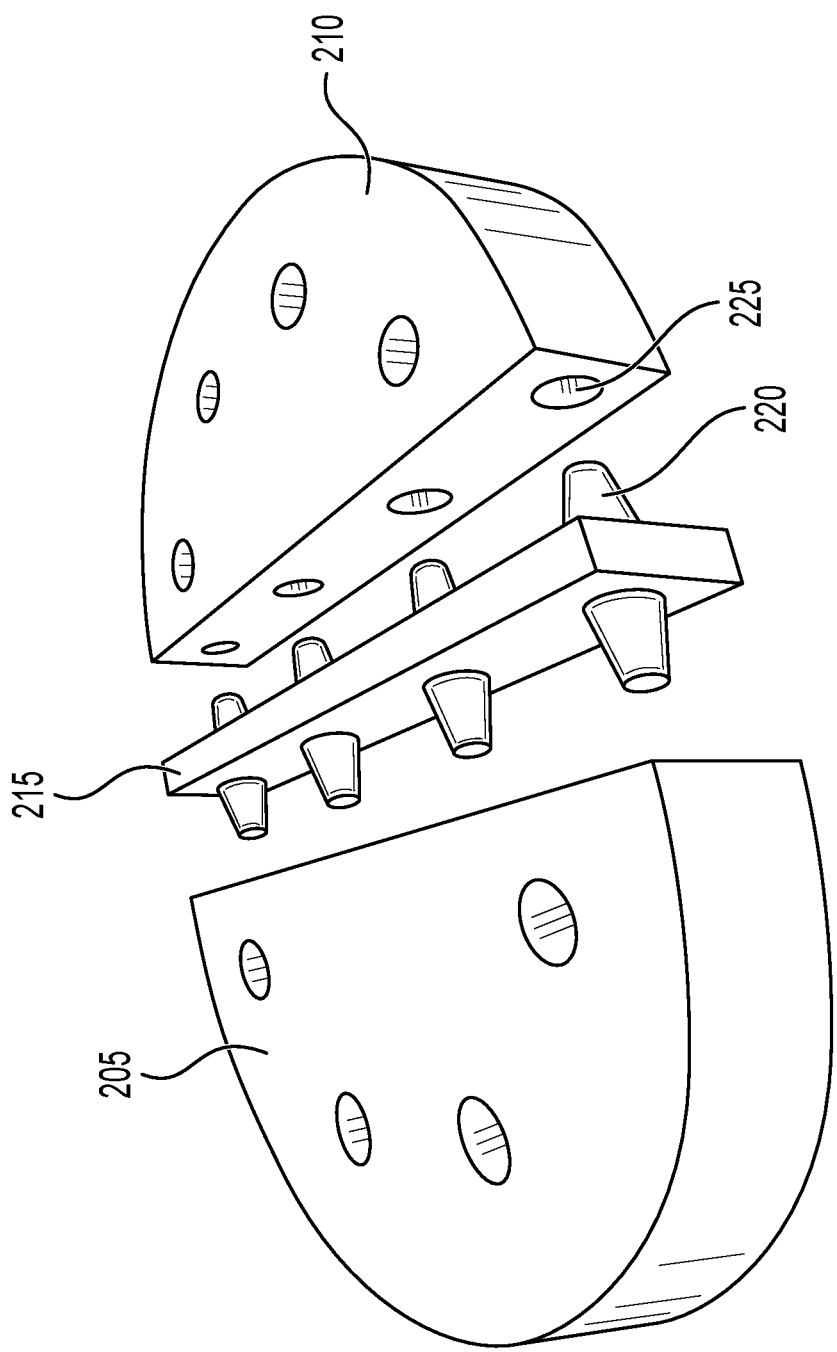
FIG. 2 is an illustration of a base of the industrial inspection system with interlock.

FIG. 2 is an illustration of the base 115. It is made up of a first base portion 205 and a second base portion 210 connected by a base portion connecting part (depicted as a joint plate 215) through a first interlock mechanism 220 and a second interlock mechanism 225. There are a plurality (4) of the first interlock mechanism 220 located on one side of the joint plate 215 and a plurality (4) of the first interlock mechanism 220 located on the other side of the joint plate 215. A plurality of receiving members (4) of the second interlock mechanism 225 are located on a side of the first base portion 205 opposite the plurality of projections (4) of first interlock mechanism 220 on one side of the joint plate 215 to form 4 coiled cup and cone magnet pairs. Likewise, the second base portion 210 has a plurality of receiving members (4) of the second interlock mechanism 225 located opposite the plurality of projections (4) of the first interlock mechanism 220 located on the other side of the joint plate 215 to form 4 coiled cup and cone magnet pairs. The thickness of the base portion connecting part 215 can be adjusted to accommodate the size of a piece to be inspected.

To ensure proper and rigid holding for various system parts the cup-cone interlock mechanism is used where a steel cone insert is embedded inside the cone part with an internal thread, and it is covered with a rubber jacket made of TPU. The TPU serves a damper due to the possible vibration due the applied magnetics load.

Figure 3:
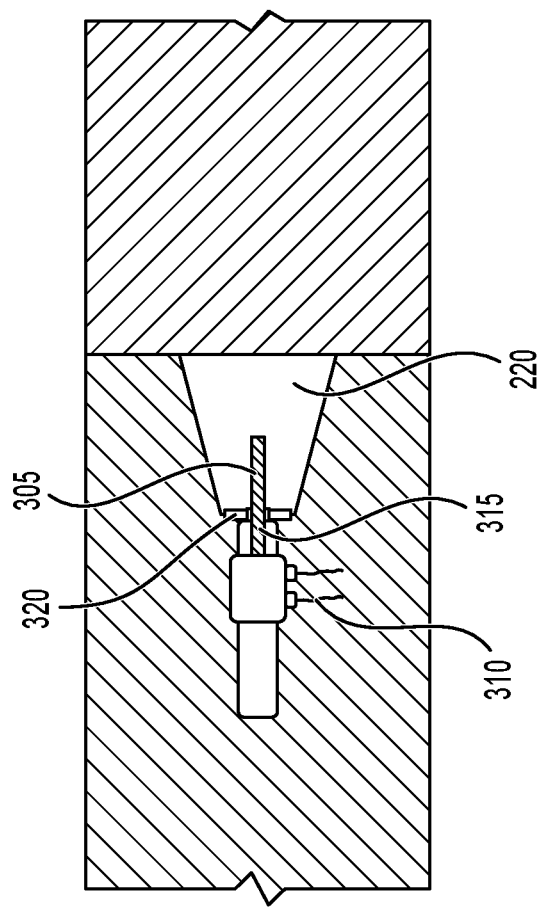
FIG. 3 is an illustration of the cup-cone interlock mechanism.

FIG. 3 is an illustration of the cup-cone interlock mechanism. The first interlock mechanism 220 is a projection (cone portion) and has an internal thread 305. In some embodiments the cone portion is made of steel and covered with a rubber jacket made of TPU. The first interlock mechanism 220 is not limited to the aforementioned shape or materials. In some instances the shape could be any geometric shape (circular, hexagonal, triangular etc.) and a covering is not always necessary. In other instances when a covering is desired other materials may be used such as plastic, silicon or a material that sufficiently dampens vibration, sound, noise etc.

Each receiving member of the second interlock mechanism 225 is in the form of a cup and receives each projection of the first interlock mechanism 220. A motor 310 can be fixed to the bottom of each of the plurality of second interlock mechanisms 225 and extends and retracts a threaded shaft 315. An electromagnetic disc 320 can also be located at the bottom of the second interlock mechanism and attracts the steel cone portion of the first interlock mechanism 220 for proper alignment and engagement.

When the first interlock mechanism 220 and second interlock mechanism 225 are engaged (as depicted in FIG. 3) the motor 310 can extend the threaded shaft 315 into the internal thread 305 of the first interlock mechanism 220, thereby securing the first interlock mechanism 220 to the second interlock mechanism 225.

In one embodiment, a non-captive mini-DC stepper motor (motor 310) is fixed at the bottom of the second interlock mechanism 225 (cup part) and is responsible for extending and retracting an axial threaded shaft (threaded shaft 315) that will engage and disengage the cup-cone interlock mechanism. An initial engagement between the cup-cone is achieved by exciting the electromagnetic disc 320 that resides inside the cup part (second interlock mechanism 225) and the steel cone (first interlock mechanism 220) is pulled inside the cup part. The final engagement will be secured by the threaded shaft 315 that is locked by the stepper motor (motor 310).

Figure 4A:
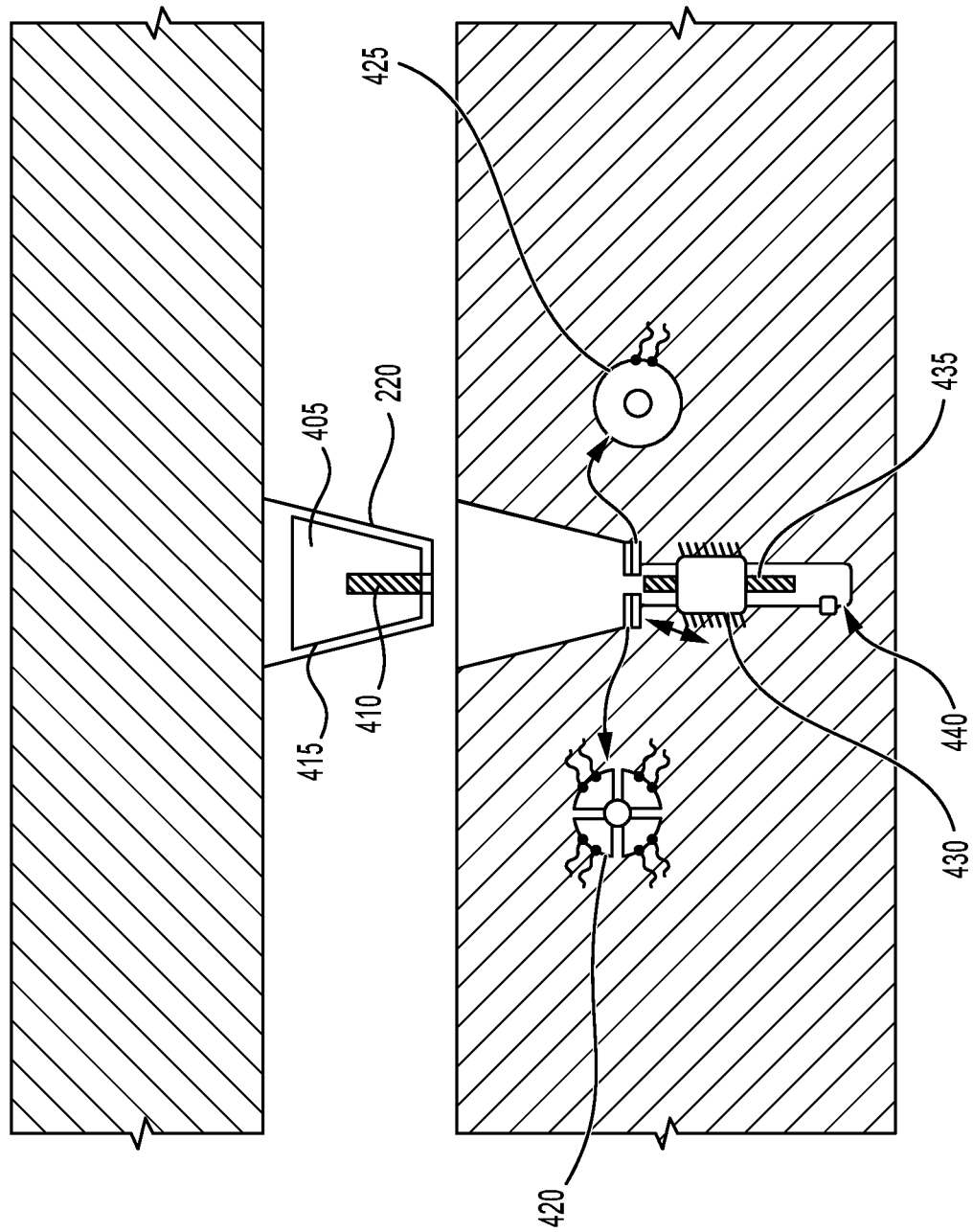
FIG. 4A is an illustration of another embodiment of the cup-cone interlock mechanism.

FIG. 4A is an illustration of another embodiment of the cup-cone interlock mechanism. This embodiment depicts the projection of the first interlock mechanism 220 (cone part) having a steel cone insert 405, an internal thread 410 and a TPU jacket cover 415. A detection sensor (depicted as a four quarters axial detection transducer 420) is located at the bottom of the second interlock mechanism 225 (cup part). An electromagnetic disc 425 is also located at the bottom of the second interlock mechanism 225 along with a motor 430, threaded shaft 435 and a proximity sensor 440.

To ensure proper and rigid holding for various system parts, the cup-cone interlock mechanism illustrated in FIG. 4A includes the steel cone insert 405 embedded inside the first interlock mechanism 220 with the internal thread 410. The cone insert 405 is covered with a rubber jacket made of TPU (TPU jacket cover 415). The TPU serves as a damper from possible vibration due the applied magnetics load.

A non-captive mini-DC stepper motor (depicted as motor 430) can be fixed at the bottom of the cup part (second interlock mechanism 225) and is responsible for extending and retracting an axial threaded shaft (threaded shaft 435) that will engage and disengage the internal thread 410 of the first interlock mechanism 220. An initial engagement between the cup-cone interlock mechanism can be achieved by exciting the electromagnetic disc 425 that resides inside the cup part (second interlock mechanism 225) thereby pulling the steel cone (first interlock mechanism 220) inside the cup (second interlock mechanism 225). The final engagement will be secured by the threaded shaft 435 that engages the internal thread 410 and is finally locked by the stepper motor 430. This locked state is maintained by continuous feedback from the four quarters axial load detection transducer 420 which is programmed with a predefined load and responds to external disturbances to maintain a constant holding force.

Correct alignment can be ensured by the four quarters axial load detection transducer 420, this can be a 3D printed flexible transducer with embedded strain gauges, proximity, mechanical switches, or touch sensors. In case misalignment is detected, the electromagnetic disc 425 will be excited several times trying to pull the cone (first interlock mechanism 220) in proper position. If there is a failure, the system will visually alert the user of engagement failure. It is worth to mention here that correct alignment should be achieved for all cup-cone pairs in order to start the shaft final engagement process. This process is managed by a main control unit. In addition, a proximity sensor 440 is fixed at bottom of the threaded shaft 435 to indicate a shaft home position. The engagement process is completed when a predefined pressure on threaded shaft 435 is sensed.

Figure 4B:
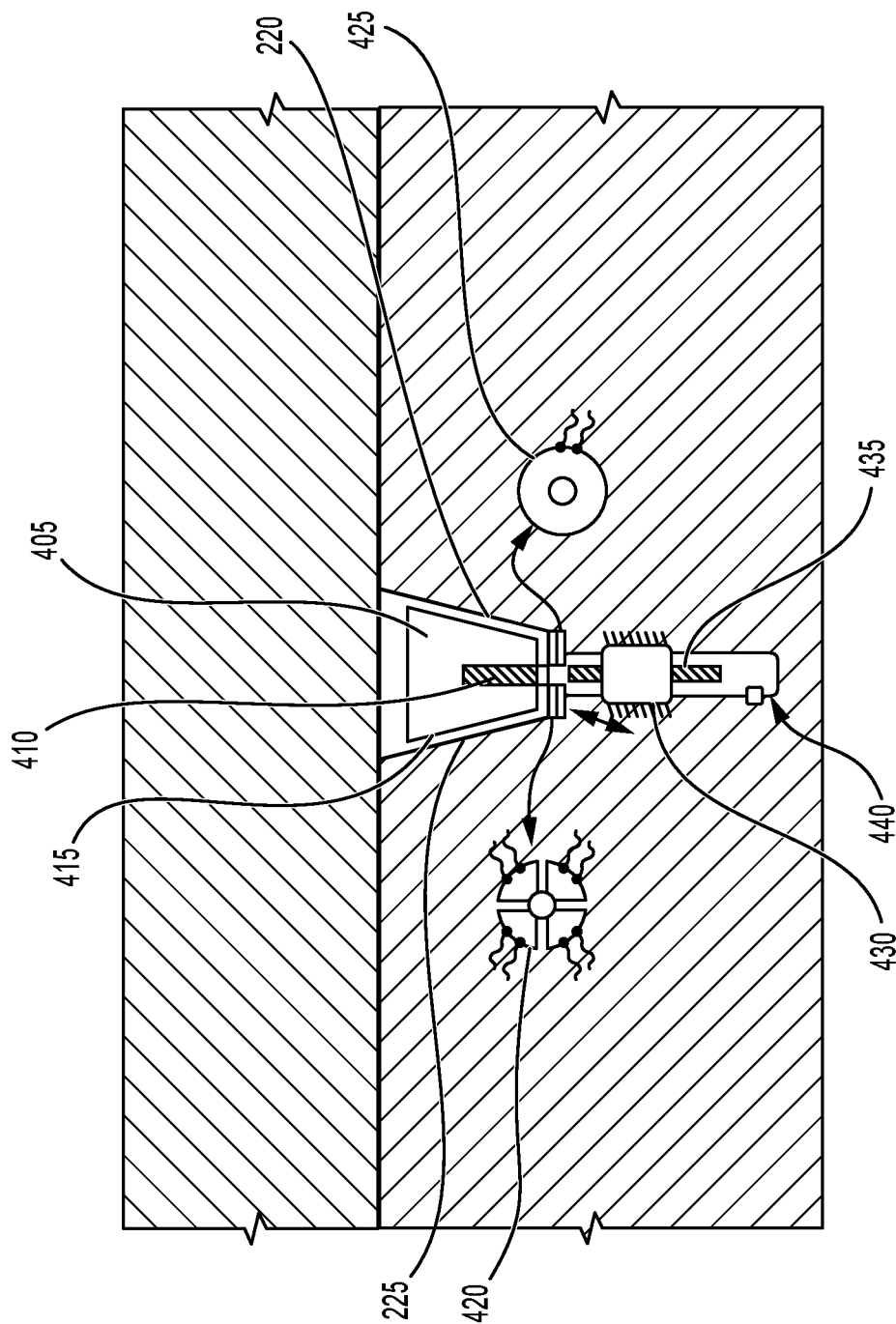
FIG. 4B is an illustration of the cup-cone interlock mechanism of FIG. 4A in a fully engaged status.

FIG. 4B is an illustration of the cup-cone interlock mechanism of FIG. 4A in a fully engaged status. The first interlock mechanism 220 is depicted as being engaged with the second interlock mechanism 225. An initial engagement between the first interlock mechanism 220 and the second interlock mechanism 225 is achieved by exciting the electromagnetic disc 425 to attract the steel cone insert 405. The stepper motor 430 then begins to move the threaded shaft 435 toward the internal thread 410. As the threaded shaft 435 engages the internal thread 410, the first interlock mechanism 220 and the second interlock mechanism 225 are brought together. The four quarters axial load detection transducer 420 gives feedback to the stepper motor 430 until there is an indication that the first interlock mechanism 220 and second interlock mechanism 225 are fully engaged. If a misalignment is detected between the first interlock mechanism 220 and the second interlock mechanism 225, the four quarters axial load detection transducer 420 will give feedback to the stepper motor 430 until proper alignment is achieved.

Figure 5:
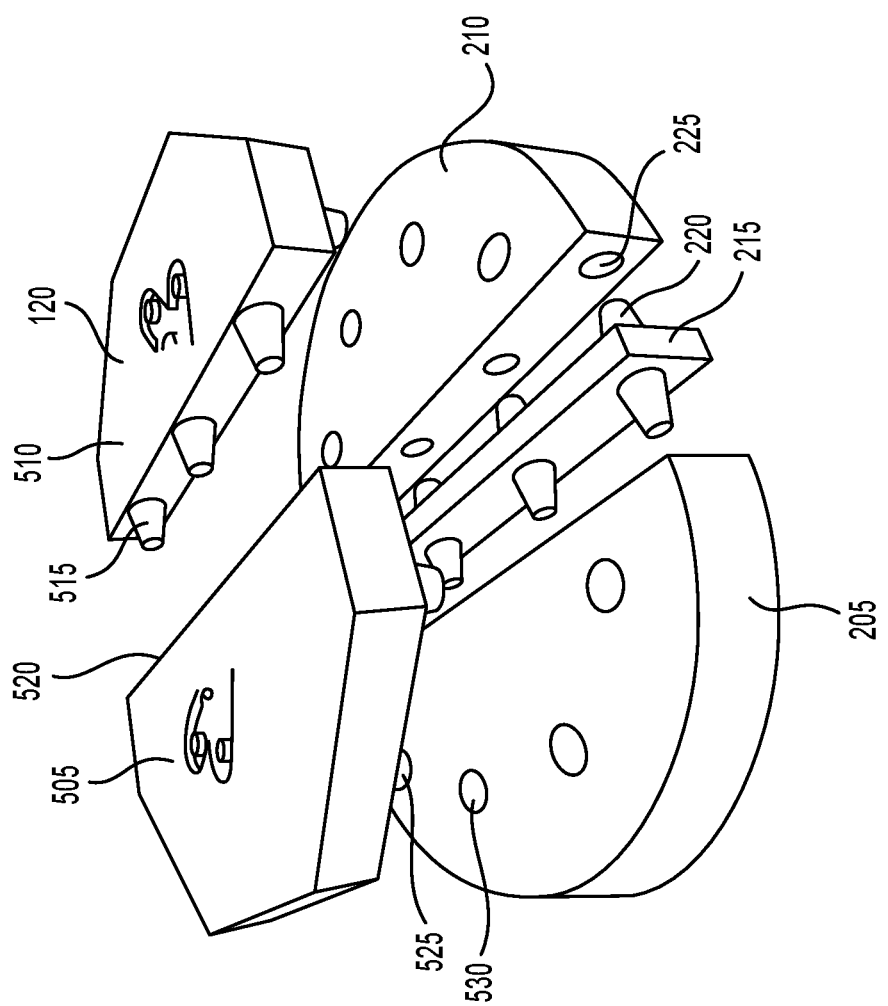
FIG. 5 is an illustration of the connection between a base and a holding fixture.

FIG. 5 is an illustration of the connection between the base 115 and the holding fixture 120. The first base portion 205 is connected to the second base portion 210 through the joint plate 215 as discussed with relation to FIGS. 3, 4A and 4B.

The holding fixture 120 has a first holding fixture part 505 and a second holding fixture part 510. There are a plurality of a first horizontal joint plate mechanism (cone part), or a fourth of the plurality of first interlock mechanisms, 515 and a plurality of a second horizontal joint plate mechanism (cup part), or a fourth of the plurality of second interlock mechanisms, 520 to connect the first holding fixture part 505 and the second holding fixture part 510. The operation of the first horizontal joint plate mechanism 515 and the second horizontal join plate mechanism 520 is the same as described with relation to FIGS. 3, 4A and 4B.

A plurality of first vertical joint plate mechanism, or a third of the plurality of first interlock mechanisms, 525 (cone part) are located opposite from a plurality of second vertical joint plate mechanism, or a third of the plurality of second interlock mechanisms, 530 (cup part) located on a top surface of the first base portion 205. The connection between the plurality of first vertical joint plate mechanism 525 and the plurality of second vertical joint plate mechanism 530 is the same as described with relation to FIGS. 3, 4A and 4B.

The holding fixture 120 can be made by 3D printing with a profile pocket that matches the lower profile of the component to be measured in order to hold and center the piece at defined locations for precise measurements. The first holding fixture part 505 and the second holding fixture part 510 can be of dissimilar colors for contrast recognition during visual inspection during the initial stage of measurements. The holding fixture 120 can be made of an aerospace-grade composite using an onyx filament material reinforced with continuous carbon fiber during the printing process. Onyx is a micro carbon fiber-filled nylon that yields accurate parts with close to flawless surface finish, and offers high strength, toughness and chemical resistance when printed alone, and can be reinforced with continuous fibers to yield aluminum-strength parts.

The self-adjustable clamping system 135 (illustrated in FIG. 1) is located on the holding fixture 120 and is an advanced toggle clamp with a unique auto adjustable holding force that is used to maintain a fixed force while holding the work piece to ensure a fixed clamping force regardless of the dimensions of the work piece. This will be reflected in the stability of the dimensions of the self-adjustable clamping system 135 and hence the stability of the measurements. These clamps combine innovative technology with the highest quality. The toggle clamps used have an extensive clamping range and adapt automatically to different workpiece dimensions within a specific clamping range. The toggle clamps can be easily installed and integrated over a 3D printed holding fixture that gives flexibility in handling a variety of manufactured pieces. The toggle clamp can operate in manual or automatic mode that is achieved by using a linear actuation device.

Figure 6A:
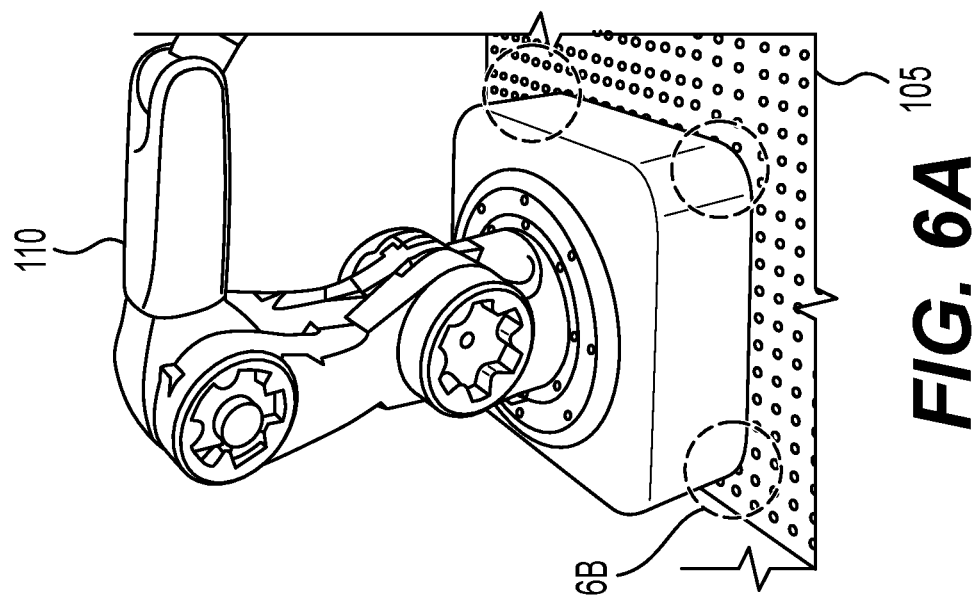
FIGS. 6A and 6B are illustrations of how a robotic arm is connected to a platform.
Figure 6B:
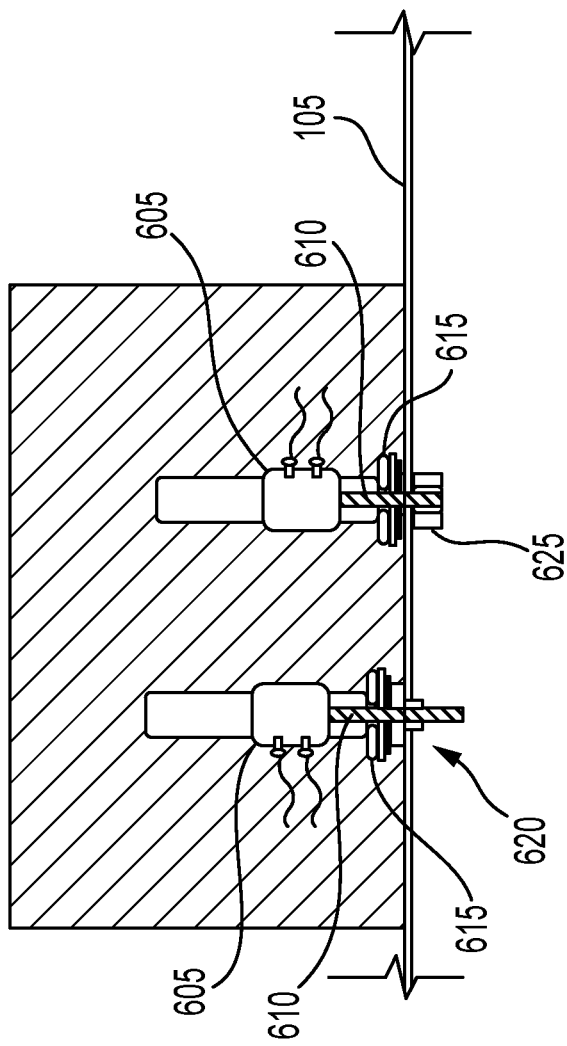

FIG. 6A is an illustration of how components, in this illustration the robotic arm 110, is connected to the platform 105. A bottom portion of the robotic arm 110, as illustrated in FIG. 6B, has a stepper motor 605 that drives a threaded shaft 610. An electromagnetic disc 615 attracts the base of the robotic arm 110 toward the platform 105. The robotic arm 110 is secured to the platform 105 by driving the threaded shaft 610 into a threaded rivet nut 620 or a self-lock nut 625. The aforementioned lock mechanism can be used between non-metallic components and a metallic one. In the example shown in FIGS. 6A and 6B, a 3D printed polymeric composite base is mounted on a metallic platform.

Figure 7A:
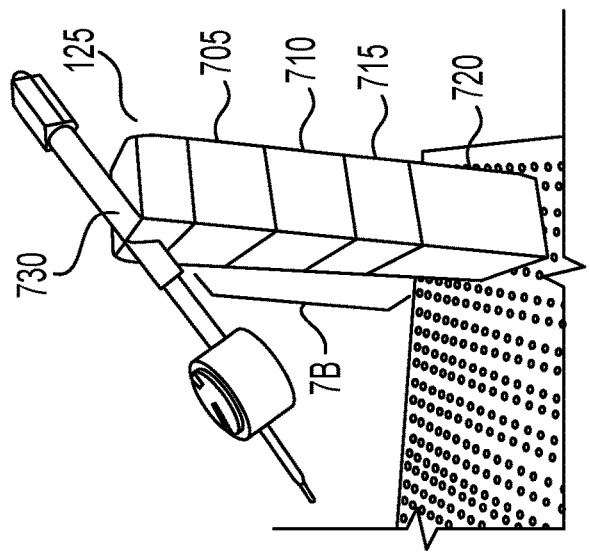
FIG. 7A is an illustration of a fixed point measuring system.
Figure 7B:
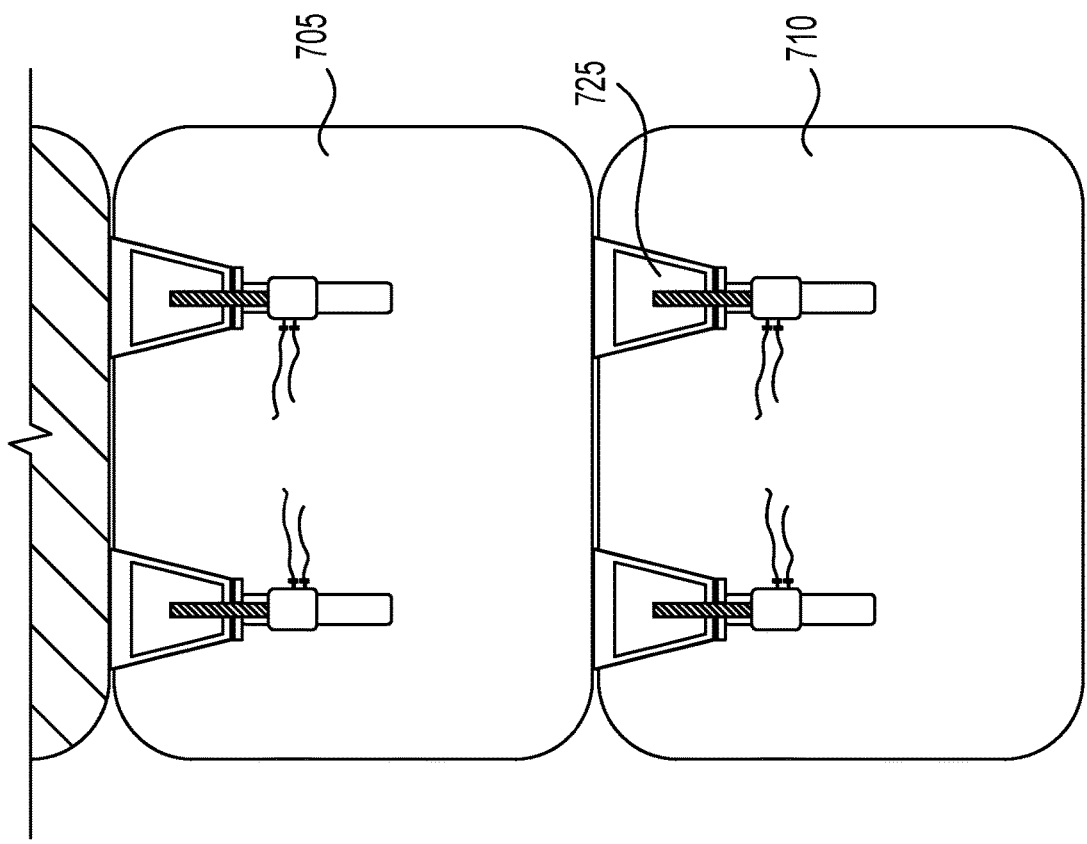
FIG. 7B is an illustration of modules of the fixed point measuring system are stacked and engaged.

FIG. 7A is an illustration of the fixed point measuring system 125. In this embodiments the fixed point measuring system 125 is a multilevel system having modules 705, 710, 715 and 720 stacked one upon another. FIG. 7B is an illustration of module 705 stacked on module 710 and being engaged with a cup cone interlock mechanism 725 which operate as described with relation to FIGS. 3, 4A and 4B.

A multi directional actuation module 730 is mounted as the uppermost module of the fixed point measuring system 125. Any sensing elements or components like dial gauges can be attached with the system to serve different functions. In some embodiments the multi directional actuation module 730 is connected with a wireless measuring system to serve as a fixed point measuring tool.

Figure 7C:
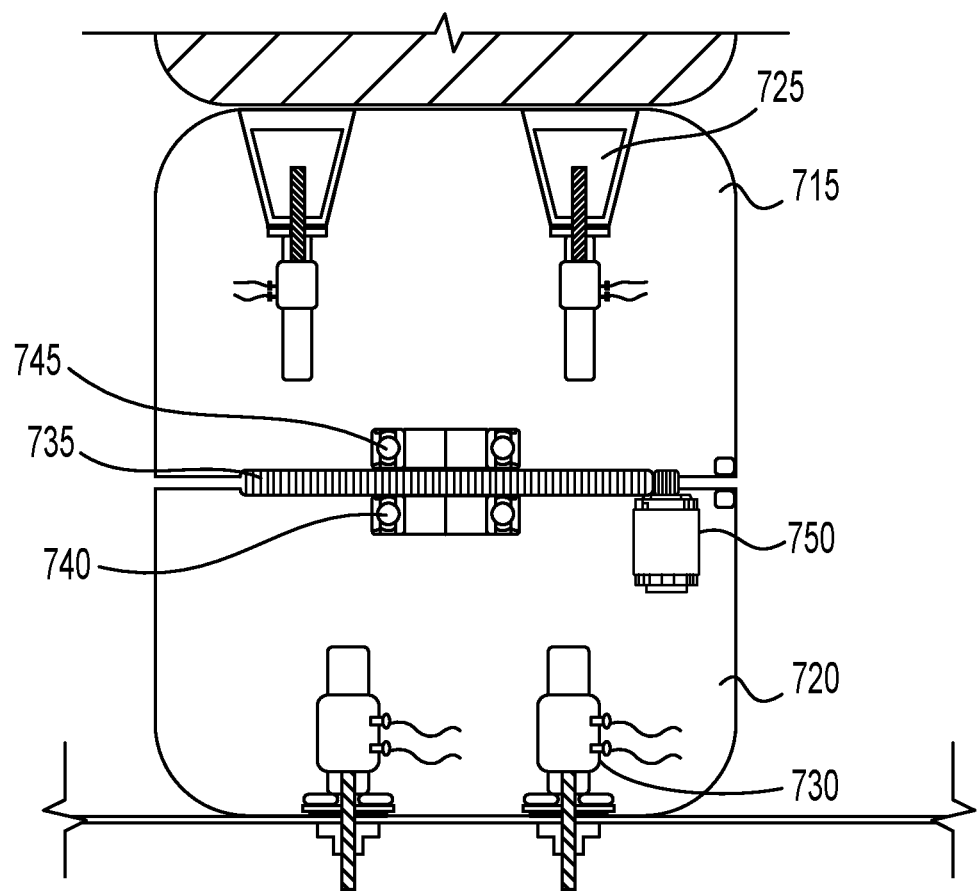
FIG. 7C is an illustration of a rotational feature of the fixed point measuring system.

FIG. 7C is an illustration of a rotational feature of fixed point measuring system 125. A gear 735 is located between module 715 and module 720. Gear 735 rotates between ball bearings 740 and 745 located in modules 720 and 715 respectively. A stepper motor 750 drives the gear 735 to rotate the fixed point measuring system 125.

Figure 8:
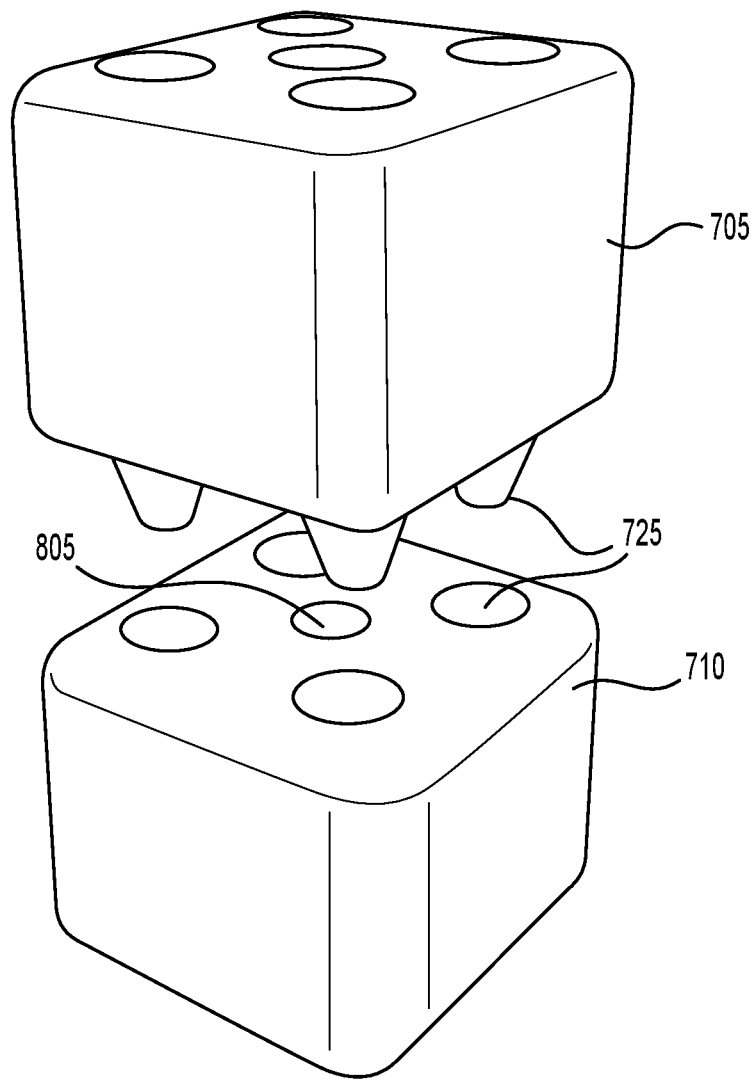
FIG. 8 is an illustration of fixed point measuring system having a through hole for wiring.

FIG. 8 is an illustration of fixed point measuring system 125. Module 705 and 710 are depicted with a plurality of the cup cone interlock mechanism 725. The modules can be plugged in together in any direction. There is a central hole 805 in each module which serves as a passage way for wiring. The configuration of the cup cone interlock mechanism 725 does not have to be necessarily cup and cone, and could have other shapes as previously discussed (e.g. circular, hexagonal, triangular etc.). The number of the cup cone interlock mechanism 725 could be four as depicted, but could be three to maintain mechanical stability. The number can vary depending on the application.

FIGS. 9A and 9B are illustrations of a rotatable base for an industrial inspection system with interlock. A rotatable base 905 has an upper rotatable base 910 and a lower rotatable base 915. The upper rotatable base 910 is attached to the base 115 through a cup cone interlock mechanism 920. There are a plurality of the cup cone interlock mechanism 920 which operate as described with relation to FIGS. 3, 4A and 4B.

A disk gear 925 is located between the upper rotatable base 910 and the lower rotatable base 915. Ball bearings 930 are located between the disk gear 925 and each of the upper rotatable base 910 and the lower rotatable base 915 to allow for easy movement. A stepper motor 935 drives the disc gear 925 which rotates the upper rotatable base 910. The lower rotatable base 915 is attached to the platform 105 through a lock mechanism 935 which operates as described with relation to FIGS. 6A and 6B. The rotatable base 905 is similar to the rotational feature of fixed point measuring system 125 as described with relation to FIG. 7C.

The rotatable base 905 enables 360 degree rotational freedom. The angular position is adjusted using the position and sensing element 140 (illustrated in FIG. 1). Rotation increases system reliability and enables measurement of a variety of work piece dimensional points using the same measurement systems, which reduces the cost and complication of the system and increases system efficiency and reliability.

The positioning and sensing element 140 aims to control the rotational motion of the rotatable base 905 and hence the base 115 through the stepper motor 935. The positioning sensing element 140 operation depends on two concepts working in parallel to assure the accuracy of the rotational motion and as a consequence the accuracy of the measured dimensions and the quality control process. The first concept depends on the base portion connecting part 215 that connects the first base portion 205 and a second base portion 210. The base portion connecting part 215 can be embedded with a counterpart transmitter that works face to face with the position and sensing element 140 to indicate the matching position according to an angle that is predefined by the user. The second feedback system can be the multi straight sides of the base 115 that are in touch with a mechanical micro switch to trigger a certain angle of rotation, this is used as a calibration to the rotatable base 905.

In an embodiment, the industrial inspection system has a plurality of second interlock mechanisms, wherein each of the plurality of second interlock mechanisms further comprise a step motor that extends and retracts the threaded shaft. In another embodiment, each of the plurality of second interlock mechanisms further comprise an electromagnetic disc that attracts each of the at least two first interlock mechanisms toward the opposite second interlock mechanism. In a further embodiment, each of the plurality of second interlock mechanisms further comprises a four quarters axial detection transducer that detects misalignment between each of the plurality of first interlock mechanisms and the opposite second interlock mechanism.

In a further embodiment, the clamping device of the industrial inspection system further comprises a first holding fixture mounted on the first base portion and a second holding fixture mounted on the second base portion, the first holding fixture having a third of the plurality of first interlock mechanisms on a horizontal surface extending toward the first base portion and a fourth of the plurality of first interlock mechanisms on a vertical surface extending toward the second holding fixture, the first base portion having a third of the plurality of second interlock mechanisms located opposite the third of the plurality of first interlock mechanisms of the first holding fixture, the second holding fixture having a fifth of the plurality of first interlock mechanisms on a horizontal surface extending toward the second base portion and a fourth of the plurality of second mechanism located opposite the fourth of the plurality of first interlock mechanisms of the first holding fixture, the second base portion having a fifth of the plurality of second interlock mechanisms located opposite the fifth of the plurality of first interlock mechanisms of the second holding fixture.

In a still further embodiment, the industrial inspection system further comprises a multi-level fixed point measuring system mounted on the support spaced away from the clamping device, the multi-level fixed point measuring system having a base level, a first upper level located above the base level and a second upper level located above the first upper level, the first upper level having a sixth of the plurality of second interlock mechanisms located on an upper horizontal surface, and the second upper level having a sixth of the plurality of first interlock mechanisms located opposite the sixth of the plurality of second interlock mechanisms such that each of the projections of the sixth of the plurality of first interlock mechanisms is received by each of the receiving members of the sixth of the plurality of second interlock mechanisms.

In some embodiments, the robotic arm comprises a motor, a threaded shaft that is driven by the motor and extends into a threaded rivet nut in the support, and an electromagnetic disc that attracts the support to the robotic arm. In further embodiments, the robotic arm comprises a motor, a threaded shaft that is driven by the motor and extends into a locknut in the support, and an electromagnetic disc that attracts the support to the robotic arm.

In still other embodiments, the industrial inspection system further comprises a rotatable base connected to the base, the rotatable base having a top part, a bottom part, a disc gear located between the top part and the bottom part; and a motor that drives the disc thereby rotating the top part. In certain embodiments, the top part has top ball bearings and the bottom part has bottom ball bearings, the top ball bearings and bottom ball bearing allowing for smooth movement.

A universal and adaptable quality control platform as described above is a movable system for quality control measurements for a workpiece. It holds the workpiece by multi-parts, is mobile, and has a rotating universal mobile holding fixture. The system can be used to perform a quality control processes on different shaped components over a wide range of testing parameters opposed to traditional systems that are made for a specific process and components. The designed quality control process can be simulated in the operation of the system to validate the real quality control process to validate the performance of the designed system.

A universal mobile holding fixture is mounted over a multi-purpose stationary base in order to move the system to another measuring or machining stage. This base consists of two different colored pieces that are connected by three cups and three cones of coiled magnets. The aim of using two different colors is to give the operator feedback on the progress of the process and assist with the scanning process when using additional structural light scanners during the quality control process. The base is made with a 3D printed aerospace-grade composite material reinforced with fiber during the printing process.

The multi-purpose stationary base can be moved and re-attached to another quality control system or machining platform and configured to attach the workpiece and to locate the workpiece during the next operation stage The fixed-point measuring system can include a linear actuation mechanism that is attached to a wireless and digital dial gauge that is used to measure the 3D position and hence the dimensions of the target points on a part. The fixed-point measuring system has one horizontal rotational movement, and the linear actuation has a vertical swinging motion, whereas the digital dial gauge has an axial direction controlled by the linear actuator.

The multi-purpose stationary base has two pieces connected by a joint plate through 4 coiled cup and cone magnets to give the flexibility to change configuration depending on the size of the inspected pieces. On the other side, the universal mobile holding fixture has two colors. Two components are connected by cup and coiled cone magnets.

The impact of the present design provides an innovative and economical solution that would serve the domestic sector. The following benefits are realized by this design.

Early detection of errors in manufactured components that reduces the number of failed components and decreases the time and cost dramatically.

The low cost of the system will be reflected positively in reducing the quality control process cost.

The ability to implement the system in the industrial sector will serve to meet the high demand for quality control processes that results from the booming domestic industries, like aerospace, defense, and petroleum industries.

Appropriate and in-demand technology transfer for the domestic sectors.

The following are some sustainability and scalability aspects of the system:

An innovative quality control solution for multi-purpose applications.

Reduction in material waste by reducing the number of failed manufactured components.

Design simplicity, manage complexity by using 3D printing technology, and divide the complicated design and function into independent subsystems with specific functionality.

Easy to manufacture due to using the independent modular design approach that divides the complex system into independent subsystems that can be manufactured independently and assembled later.

Upgradable and easy to maintain, replace, or maintain due to the independent modular architecture.

Reconfigurable to suit new design and requirements.

Adopting 3D printing with optimization techniques to build the system offers the capability to design innovative solutions and use aerospace grade material that offers lightweight and stiff material like using Onyx and carbon fiber.

Reduce the shortage of the needed skilled workers with high practical experience.

Technical feasibility: substituting the costly and complicated quality control systems with light, easy 3D printed system using traditional capabilities, safe, durable, and easy to operate. It can be used for different industrial applications and can be modified based on the requirements since it is made of a modular system that consists of different sub-systems that can be replaced, developed, and maintained easily. The system does not need highly skilled and high-wage operators. Moreover, the system can be made in a short time.

System necessity: Shortage in design and manufacturing skilled labors to design and manufacture metallic fixtures, needs high-quality training, life monitoring to quality control process, open new horizons to find innovative solutions to domestic industrial manufacturers, like aerospace and military industries that will shorten the time and cost of the quality control process that is aligned with the 4.0 industrial revolution.

The system as described can include discrete integrated functional modules. There is a main control and monitoring module and a central control unit that monitors and control all other modules. This module ensures smooth system operation in both synchronous and sequential modes. It consists of both hardware and software components.

The core component in the electronic system is the single board computer. In one embodiment, it is a complete Windows 10 computer built on a single circuit board and is equipped with a micro-controller unit. The single board computer communicates with other modules to maintain synchronization between system modules and monitors overall operation.

In one embodiment, the control and monitoring software is the core control software responsible for maintaining overall system functionality by collecting and analyzing the feedback from all other modules and sending the required commands to achieve the desired integration and synchronization. Timing plays a vital role in successful system operation with a variety of induvial complex tasks running in critical time constraints such as ensuring the exact angular piece position before starting robotized dynamic measurements and the correct orientation of the linear actuator for fixed point measurements. It communicates with an innovative integrated measuring module as follows:

Operating the fixed-point measurement process by controlling the angular position and linear actuator displacement for correct positioning of the desired fixed point.

Commanding the robot arm for setting the desired dynamic measurement points is achieved by communicating with the robot arm control software.

Communicating with the pre-scanning system using a structured light 3D scanning system.

Receiving the feedback from all the above processes and ensures the synchronization and harmony of different measurement processes to achieve successful system operation.

Communication with the universal and adaptable quality control platform is as follows:

Control the quality control platform rotation to achieve desired angles for correct piece orientation.

Control the self-adjustable clamping system in automatic operating mode by controlling the attached linear actuator.

In one embodiment, a quality control and monitoring software module establishes communication with smart digital gauges and other measuring instruments to receive, collect and visualize the wirelessly transmitted measurement data simultaneously from multiple wireless measurement devices through a customized user interface. The software has the following features:

Adding and configuring measuring devices, establishing wireless communication, and setting the acquisition rate.

The possibility of visualizing the collected data as digital, analog, and graphical, and export it to a file for further analysis.

Acceptance and rejection feature. The software enables the user to define threshold measurement values to set the quality control threshold that would indicate the accepted or rejected parts while doing the measurement process and it will alert the user if the reading exceeds the predefined threshold value.

Provides user interface to display measured data locally, in addition to sending the collected data to the cloud for remote monitoring and analysis.

Accept multi-channel inputs from different measurement devices simultaneously with live monitoring capabilities. Moreover, the system can estimate the process capability while performing the measurements analysis process. It provides statistical indicators of a process's ability to manufacture components under defined limitations reliably. Based on the process state and the way of determining the values of the standard deviation value, the Cp, process capability index (Cpk), preliminary process capability (Pp), and preliminary process capability Index (Ppk) are measured to decide how the system works. The Cp and Cpk calculations use sample process capability (Cp) variance, or deviation mean in rational subgroups, while the Pp and Ppk are calculated using standard deviation, based on the data analyzed (whole population). In statistical control, the indices Cp and Cpk measure fundamental well-built-up procedures. The Pp and Ppk indices assess a novel or statistical system.

The robot arm control software operates to move the robot arm to the desired dynamic measurement point based on a command received from the control monitoring software.

In one embodiment, an innovative integrated measuring module performs the core system functions related to quality control by facilitating automatic measurement of predefined fixed and dynamic points. It can have several subsystems and deals with other modules and software.

In one embodiment, a dynamic points robotized measuring system enables measuring of critical and complicated xyz positions that cannot be achieved by the fixed-point measuring system, due to its multi-freedom capability. A smart wireless and digital gauge with a high precision measuring range are attached to the robotics arm controlled by the robotic arm control software. Command and instructions are received from the control monitoring software.

In one embodiment, a self-learning robotics system can learn operations and sense the environment to operate accordingly. The robot does not depend on any specific programming as it trains itself to react differently in different measuring and quality control scenarios. It autonomously adapts to changing environments and optimizes itself for each task to be performed. This unique feature gives it the robot the capability to handle and customize the quality control process. The self-learning robot is attached with a smart wireless and digital gauge that is used to measure complicated xyz positions that cannot be achieved by the fixed point measuring system, since it has a multi-freedom rotational axis.

In one embodiment, a fixed point measuring system can be attached to the base of the universal and adaptable quality control platform by bolted joints. This enables the operator to design the fixed-point quality control process to inspect the desired point of the part under examination. The fixed point measuring system contains a linear actuation component that is attached with a wireless and digital dial gauge that is used to measure the xyz position and hence the dimensions of the target points on the part. The fixed point measuring system has one horizontal rotational movement, and the linear actuation has vertical swinging motion, whereas the wireless and digital dial gauge has an axial direction controlled by the linear actuator.

In one embodiment, a pre-scanning system using a structured light 3D scanner provides a quick check on a work piece under examination. This is the first step of quality control and if the piece passes, it will be subjected to other quality check processes. This saves valuable time in eliminating the need to perform a comprehensive quality check on the work piece since it can be eliminated during the first step.

In one embodiment, a wireless digital dial gauge is a high-precision dial indicator with an integrated Bluetooth transmitter to wirelessly transmit the measured data to the quality control monitoring software. This enables viewing and recording data remotely.

The following are some features of the wireless digital dial gauge.

Integrated Bluetooth Low Energy (BLE)
Multiple platform support (iOS, Android, PC)
Single or Continuous data logging
Rechargeable battery (50-hour life/single charge)
Multiple-device connectivity The wireless digital dial gauge is used in both the dynamic points measuring system and the fixed point measuring system.

The developed industrial inspection system with interlock as described can be used as an intermediate quality control step while the manufacturing process is underway. The identification of defective parts will be ensured before proceeding to the next stage of the machining process. The result will be a reduction in cost, time savings and production of high-quality parts. This is possible by using a holding fixture that can be attached to and detached from a platform through a set of coiled magnetics installed in a rotating base that supports a base on which the holding fixture is attached. The rotating base is installed with a comprehensive operating system. So in order to perform quality control in any stage of the manufacturing process, the holding fixture can be disconnected from the rotating base by triggering a signal by the operator to release the coiled magnets to disengage the holding fixture from the rotating base, and then the user can take the holding fixture to the quality control stage of the platform to perform an intermediate inspection by attaching the holding fixture to another rotating base of the platform. The system has a unique cup and cone interlock mechanism to attach and detach the holding fixture to and from the base. The base can be made up of two pieces connected by a joint plate through, e.g., four coiled cups and cone interlock mechanisms to give the flexibility to change it depending on the size of the inspected work pieces. The holding fixture, in one embodiment, has two colors, two components are connected together by three cup and coiled cone interlock mechanisms. The aim of using two different colors is to give the operator feedback about the process progress and assist with the scanning process when using additional structure light scanners during the quality control process. After the examination, the holding fixture will be moved again for further machining processes.

It is to be understood that the industrial inspection system with interlock is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. An industrial inspection system with interlock having a clamping device mounted on a support and a robotic arm mounted on the support spaced away from the clamping device, the industrial inspection system comprising:
   a plurality of first interlock mechanisms each having a plurality of projections that each include an internal thread extending into the projection;
   a plurality of second interlock mechanisms each having a plurality of receiving members that receive the plurality of projections, each of the plurality of receiving members having a threaded shaft that extends into the internal thread extending into each of the plurality of projections when rotated, the second interlock mechanism tightening toward the first interlock mechanism when the threaded shafts are rotated;
   the clamping device having a base comprising:
      a first base portion having a first base portion vertical surface that includes a first of the plurality of second interlock mechanisms,
      a second base portion having a second base portion vertical surface located opposite the first base portion vertical surface, the second base portion vertical surface having a second of the plurality of second interlock mechanisms,
      a base portion connecting part located between the first base portion and the second base portion, the base portion connecting part having a base portion first surface located opposite the first base portion vertical surface and a base portion second surface located opposite the second base portion vertical surface,
      the base portion first surface having a first of the plurality of first interlock mechanisms and the base portion second surface having a second of the plurality of first interlock mechanisms,
      each of the first and second of the plurality of first interlock mechanisms located opposite of each of the first and second of the plurality of second interlock mechanisms, and
      each of the plurality of projections located opposite each of the plurality of receiving members.

2. The industrial inspection system of claim 1 wherein each of the plurality of second interlock mechanisms further comprise a step motor that extends and retracts the threaded shaft.

3. The industrial inspection system of claim 1 wherein each of the plurality of second interlock mechanisms further comprise an electromagnetic disc that attracts each of the at least two first interlock mechanisms toward the opposite second interlock mechanism.

4. The industrial inspection system of claim 1 wherein each of the plurality of second interlock mechanisms further comprises a four quarters axial detection transducer that detects misalignment between each of the plurality of first interlock mechanisms and the opposite second interlock mechanism.

5. The industrial inspection system of claim 1 wherein the clamping device further comprises a first holding fixture mounted on the first base portion and a second holding fixture mounted on the second base portion,
   the first holding fixture having a third of the plurality of first interlock mechanisms on a horizontal surface extending toward the first base portion and a fourth of the plurality of first interlock mechanisms on a vertical surface extending toward the second holding fixture,
   the first base portion having a third of the plurality of second interlock mechanisms located opposite the third of the plurality of first interlock mechanisms of the first holding fixture,
   the second holding fixture having a fifth of the plurality of first interlock mechanisms on a horizontal surface extending toward the second base portion and a fourth of the plurality of second mechanism located opposite the fourth of the plurality of first interlock mechanisms of the first holding fixture, the second base portion having a fifth of the plurality of second interlock mechanisms located opposite the fifth of the plurality of first interlock mechanisms of the second holding fixture.

6. The industrial inspection system of claim 5 further comprising a clamping system mounted on the first holding fixture and the second holding fixture.

7. The industrial inspection system of claim 1 further comprising a multi-level fixed point measuring system mounted on the support spaced away from the clamping device, the multi-level fixed point measuring system having a base level, a first upper level located above the base level and a second upper level located above the first upper level, the first upper level having a sixth of the plurality of second interlock mechanisms located on an upper horizontal surface, and the second upper level having a sixth of the plurality of first interlock mechanisms located opposite the sixth of the plurality of second interlock mechanisms such that each of the projections of the sixth of the plurality of first interlock mechanisms is received by each of the receiving members of the sixth of the plurality of second interlock mechanisms.

8. The industrial inspection system of claim 1 wherein the robotic arm comprises a motor, a threaded shaft that is driven by the motor and extends into a threaded rivet nut in the support, and an electromagnetic disc that attracts the support to the robotic arm.

9. The industrial inspection system of claim 1 wherein the robotic arm comprises a motor, a threaded shaft that is driven by the motor and extends into a locknut in the support, and an electromagnetic disc that attracts the support to the robotic arm.

10. The industrial inspection system of claim 1 further comprising a rotatable base connected to the base, the rotatable base having a top part, a bottom part, a disc gear located between the top part and the bottom part; and a motor that drives the disc thereby rotating the top part.

11. The industrial inspection system of claim 10 wherein the top part has top ball bearings and the bottom part has bottom ball bearings, the top ball bearings and bottom ball bearing allowing for smooth movement.

12. An interlock system for an industrial inspection system, the interlock system comprising:

a first interlock mechanism having a projection that includes an internal thread extending into the projection; and a second interlock mechanism having a receiving member that receives the projection, the second interlock mechanism having a threaded shaft that extends into the internal thread of the first interlock mechanism when rotated, the second interlock mechanism tightening toward the first interlock mechanism when the threaded shaft is rotated.

13. The interlock system of claim 12 wherein the second interlock mechanism further comprises a step motor that extends and retracts the threaded shaft.

14. The interlock system of claim 12 wherein the second interlock mechanism further comprises an electromagnetic disc that attracts the first interlock mechanism toward the second interlock mechanism.

15. The interlock system of claim 12 wherein the second interlock mechanism further comprises a four quarters axial detection transducer that detects misalignment between the first interlock mechanism and the second interlock mechanism.

* * * * *